US012710781B2

(12) United States Patent
Peterson et al.

(10) Patent No.: US 12,710,781 B2
(45) Date of Patent: Aug. 18, 2026

(54) PORTABLE TOOL WITH GRIPPABLE REAR HANDLE

(71) Applicant: ECHO INCORPORATED, Lake Zurich, IL (US)

(72) Inventors: Brent Peterson, Buffalo Grove, IL (US); Peter D. Kim, Vernon Hills, IL (US)

(73) Assignee: ECHO INCORPORATED, Lake Zurich, IL (US)

( * ) Notice: Subject to any disclaimer, the term of this patent is extended or adjusted under 35 U.S.C. 154(b) by 0 days.

(21) Appl. No.: 19/037,951

(22) Filed: Jan. 27, 2025

(65) Prior Publication Data

US 2026/0079520 A1 Mar. 19, 2026

Related U.S. Application Data

(63) Continuation-in-part of application No. 17/969,508, filed on Oct. 19, 2022, now Pat. No. 12,349,624.

(51) Int. Cl.

| | |
|---|---|
| ***G05G 1/06*** | (2006.01) |
| ***B25G 1/10*** | (2006.01) |
| ***B25G 3/14*** | (2006.01) |
| ***B25G 3/38*** | (2006.01) |
| ***G05G 1/01*** | (2008.04) |
| ***G05G 1/02*** | (2006.01) |
| ***G05G 11/00*** | (2006.01) |
| ***G05G 23/00*** | (2006.01) |

(52) U.S. Cl.
CPC ............... *G05G 1/06* (2013.01); *B25G 1/102* (2013.01); *B25G 3/14* (2013.01); *B25G 3/38* (2013.01); *G05G 1/025* (2013.01); *G05G 23/00* (2013.01); *G05G 1/01* (2013.01); *G05G 11/00* (2013.01)

(58) Field of Classification Search
CPC .. A01D 34/902; A01D 34/416; A01D 34/824; B25F 5/026
See application file for complete search history.

(56) References Cited

U.S. PATENT DOCUMENTS

| | | | |
|---|---|---|---|
| 1,534,075 | A | 4/1925 | Parrish |
| 4,179,805 | A | 12/1979 | Yamada |
| 4,996,773 | A | 3/1991 | Albertson |

(Continued)

*Primary Examiner* — Jake Cook
(74) *Attorney, Agent, or Firm* — Wood, Phillips, Katz, Clark & Mortimer

(57) ABSTRACT

A portable tool having an elongate frame with a front-to-rear lengthwise axis. The portable tool is configured to be held in a starting orientation, wherein the lengthwise axis of the frame extends substantially horizontally, with a user's hands separately engaging the portable tool at a first region and a second region forwardly of the first region. The portable tool has: a) a gripping assembly at the second region; and b) an engaging structure at the first region and including a handle with a gripping length that extends along a gripping line. The handle is connected to the frame and configured so that with the portable tool in the starting orientation and the handle in a first position: i) the handle gripping line makes an angle of no more than 15° with a horizontal reference plane containing the lengthwise axis of the elongate frame; and ii) a space is formed between the gripping length and the elongate frame to accommodate fingers on the user's one hand with the user's one hand grasping the gripping length.

24 Claims, 10 Drawing Sheets

(56) References Cited

U.S. PATENT DOCUMENTS

| | | | | |
|---|---|---|---|---|
| 5,661,960 | A | 9/1997 | Smith et al. | |
| 5,867,911 | A | 2/1999 | Yates et al. | |
| 6,581,246 | B1 | 6/2003 | Polette | |
| 6,880,251 | B2 | 4/2005 | Gambert | |
| 9,414,540 | B2 | 8/2016 | Morabit | |
| 9,507,371 | B1 | 11/2016 | Day | |
| 10,477,761 | B1 | 11/2019 | Wrinkle | |
| 2002/0004989 | A1 | 1/2002 | Schweigert | |
| 2004/0128839 | A1 | 7/2004 | Shaffer et al. | |
| 2006/0096135 | A1 | 5/2006 | Shaffer | |
| 2007/0068008 | A1* | 3/2007 | Wu | A01D 34/416 30/298 |
| 2008/0040892 | A1 | 2/2008 | Jenkins | |
| 2008/0092398 | A1 | 4/2008 | Hurley | |
| 2009/0178520 | A1 | 7/2009 | Engelfried | |
| 2012/0048581 | A1 | 3/2012 | Yamada | |
| 2012/0073145 | A1 | 3/2012 | Gehrki | |
| 2013/0047802 | A1 | 2/2013 | Vierck | |
| 2013/0161047 | A1* | 6/2013 | Hallendorff | A01D 34/902 173/170 |
| 2014/0260839 | A1 | 9/2014 | Hurley | |
| 2017/0295721 | A1 | 10/2017 | Carl | |
| 2018/0103584 | A1* | 4/2018 | Orton | A01D 34/416 |
| 2019/0357436 | A1 | 11/2019 | Hamilton | |
| 2020/0061796 | A1* | 2/2020 | Jore | B25F 3/00 |

* cited by examiner

Fig. 20
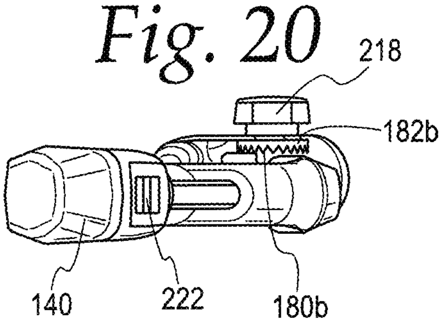
Fig. 19
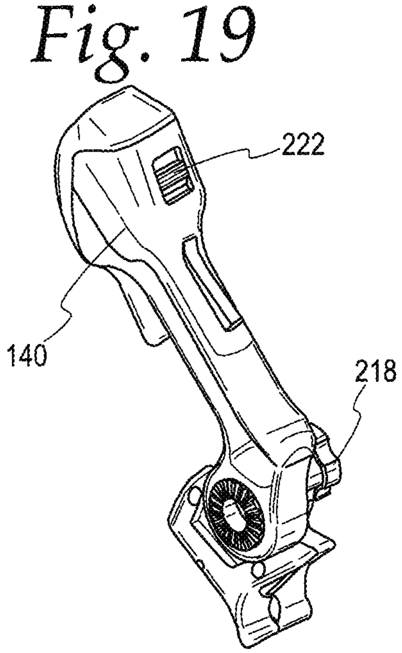
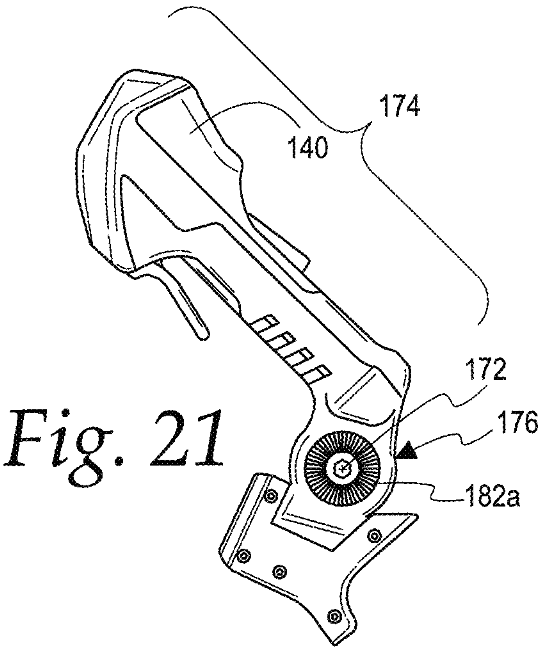
Fig. 21
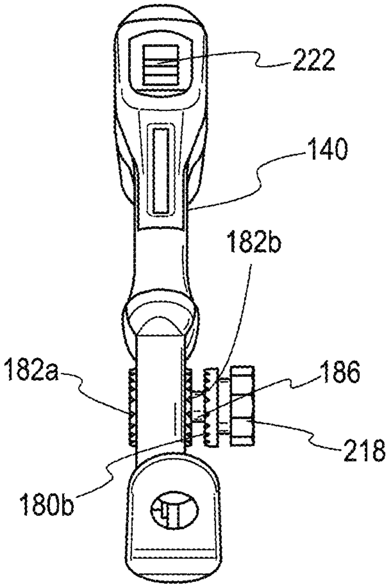
Fig. 23
Fig. 22
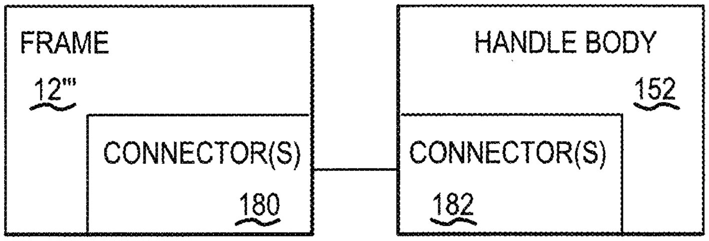

PORTABLE TOOL WITH GRIPPABLE REAR HANDLE

CROSS-REFERENCE TO RELATED APPLICATIONS

This application is a continuation-in-part of U.S. patent application Ser. No. 17/969,508 filed Oct. 19, 2022.

BACKGROUND OF THE INVENTION

Field of the Invention

This invention relates to portable tools, such as stick tools, and, more particularly, to a portable tool having a rear handle that can be gripped by a hand of a user.1

Background Art

A multitude of portable tools are currently available with designs wherein a user engages the portable tool with his/her hands at spaced locations to allow lifting and reorientation of the tool to control the positioning of a working unit thereon.

One category of portable tools of this type is used in the landscape industry. This category is commonly characterized as "stick tools". Generally, an elongate frame—commonly having a tubular length portion—supports a working unit at a forward region of the frame and a drive for the working unit either in the vicinity of the working unit or at or towards a rear end of the frame. The rear region of the tool is configured to be engaged by one hand of a user. Various engaging structures are provided to allow a user's hand to support the rear region, typically by gripping either the frame, a drive housing, or a dedicated part on the frame, such as a grippable handle.

Between the front and rear frame ends, a separate gripping assembly is provided to be engaged by a user's other hand.

The tool components are laid out and the weight thereof distributed so that with the user's two hands holding the portable tool, the portable tool is balanced in a starting upright orientation.

In one form of the forward gripping assembly, a ring shape, or "C" shape, is formed with a configuration that allows the user to grip the same at any of a number of different locations. This may facilitate supporting of the portable tool in different angular orientations around a lengthwise axis thereof.

With a portable tool that incorporates, for example, a trimmer head as the working unit, the structure that is engaged by the user's hand is preferably configured to allow comfortable reorientation of the portable tool by the user to allow strategic placement, and maneuvering, of the trimmer head. For example, with the trimmer, certain tasks may be performed with the portable tool in the starting upright orientation. However, certain applications may require that the portable tool be used while being additionally pivoted to different orientations around laterally extending and/or lengthwise axes. Essentially, universal reorientation is desirable to facilitate use with a wide range of different site conditions.

Designers of this type of equipment focus initially upon holding structure that permits safe operation. At the same time, versatility is a critical design criteria as is user comfort, which is particularly an issue with professional landscapers that may be using portable tools for hours each day and in many different orientations.

Thus, designers of this type of portable tool focus on ergonomics. One feature that has been incorporated into gripping assemblies with C-shaped handles is to allow the handle to pivot around a laterally extending axis. This is done primarily to allow a laterally extending gripping length of the "C" shape to be shifted in both up-and-down and fore-and-aft directions, which is carried out as dictated by a particular capability and feel that is desired.

Further, it is known to orient a primary length of the C-shaped handle, that extends generally laterally, at a selected angle so that a vertical plane containing the line of this gripping length is non-orthogonal to a vertical plane through the lengthwise/fore-and-aft central axis of the frame. The angular relationship between these planes may change depending upon whether a user is right- or left-handed. This angled relationship allows the user's gripping hand to be in a more comfortable and natural position while supporting and operating the portable tool.

In one form of rear engaging structure, a handle is provided that has a gripping length against which a user's fingers on one hand can be wrapped to grasp the handle. One such handle is shown in U.S. Pat. No. 5,661,960, to Smith et al. (Smith).

Smith's rear handle is pivotable between a forwardly projecting position and an upwardly projecting position, as shown in FIG. 4, to facilitate comfortable operation of the tool by different users. A substantial angle must be maintained between the length of the handle and an elongate frame on the tool to maintain a volume below the handle adequate to accommodate the user's fingers wrapped against the handle.

The industry continues to seek out alternative designs to facilitate positive and comfortable engagement of a portable tool by different users and one that will reduce fatigue with the portable tool being used in different orientations over extended periods. 1

SUMMARY OF THE INVENTION

In one form, the invention is directed to a portable tool having a front, a rear, and spaced sides and having an elongate frame with a length and a front-to-rear lengthwise axis. The portable tool has a working unit on the frame and a drive for the working unit. The portable tool is configured to be held in a starting orientation, wherein the lengthwise axis of the frame extends substantially horizontally, with a user's hands engaging the portable tool at a first region and a second region spaced forwardly of the first region. The portable tool has: a) a gripping assembly at the second region; and b) an engaging structure at the first region and including a handle. The handle has a body with a gripping length that extends along a gripping line and is configured so that a user's fingers on one hand of the user can be wrapped against the gripping length to grasp the gripping length in the one hand. The handle is connected to the frame and configured so that with the portable tool in the starting orientation and the handle in a first position: i) the handle gripping line makes an angle of no more than 15° with a horizontal reference plane containing the lengthwise axis of the elongate frame; and ii) a space is formed between the gripping length and the elongate frame to accommodate fingers on the user's one hand with the user's one hand grasping the gripping length.

In one form, with the portable tool in the starting orientation and the handle in the first position the handle gripping line makes an angle of no more than 10° with the horizontal reference plane.

In one form, with the portable tool in the starting orientation and the handle in the first position, the handle gripping line is approximately parallel to the horizontal reference plane.

In one form, the handle is movable relative to the frame to change the angle the gripping line makes with the horizontal reference plane with the portable tool in the starting orientation.

In one form, the handle body has a mounting portion that projects at an angle to the gripping line.

In one form, the mounting portion is connected for pivoting movement relative to the elongate frame around an axis extending in a side-to-side direction through the mounting portion.

In one form, the handle body has a mounting end and a free end spaced from each other along the gripping line. A region of the body adjacent the free end is enlarged to block sliding movement of a user's one hand, grasping the gripping length, up to and past the free end of the body.

In one form, the handle body has at least one of: a) an on/off switch for the drive; and b) a movable throttle lever for controlling an operating speed for the drive.

In one form, the handle is movable relative to the frame and further includes at least one connector on the frame that cooperates with at least one connector on the handle body to selectively releasably maintain the handle in different positions relative to the frame.

In one form, the at least one connector on the frame consists of first and second connectors on the frame. The at least one connector on the handle body consists of first and second connectors that respectively cooperate with the first and second connectors on the frame to releasably maintain the handle in different positions relative to the frame.

In one form, the one connector on the frame has a plurality of teeth configured to mesh with a plurality of teeth on the one connector on the handle body with the handle in different positions relative to the frame.

In one form, the portable tool has an adjusting state for the handle and an operating state for the handle. The portable tool further includes an actuator that is changeable between a released state and a secured state. With the actuator in the released state, the plurality of teeth on the one connector on the frame are not meshed with the plurality of teeth on the one connector on the handle body, thereby allowing the handle to be repositioned relative to the elongate frame. With the actuator in the secured state, the plurality of teeth on the one connector on the frame are meshed with the plurality of teeth on the one connector on the handle body to thereby maintain the handle in any one of a plurality of selectable positions relative to the frame.

In one form, the drive for the tool is a battery-operated drive.

In one form, the portable tool further includes a battery. The battery and drive together define a power unit. The handle is located adjacent to and forwardly of the power unit. The power unit defines an upwardly facing surface to support a forearm on an arm of a user with the one hand grasping the gripping length.

In one form, the actuator is a threaded actuator that is turned around an actuator axis to change the actuator between the secured and released states. The actuator has a knob that is configured to be grasped by a user's hand to facilitate turning of the actuator around the actuator axis.

In one form, the one connector on the frame is mounted on a bendable support that is on a mounting assembly secured to the frame. With the actuator in the released state the bendable support is in a relaxed state, wherein the plurality of teeth on the one connector on the frame are not meshed with the plurality of teeth on the one connector on the handle body. With the actuator in the secured state a part of the bendable support is biasably moved to cause the plurality of teeth on the one connector on the frame to be meshed with the plurality of teeth on the one connector on the handle body.

In one form, the handle is pivotable relative to the frame through a range of at least 75°.

In one form, the gripping assembly has a gripping length extending in a side-to-side direction.

In one form, the gripping assembly is configured so that a position of the gripping length on the gripping assembly relative to the frame can be changed.

In one form, the position of the gripping length on the gripping assembly relative to the elongate frame is changed by pivoting the gripping length on the gripping assembly relative to the frame around an axis.

BRIEF DESCRIPTION OF THE DRAWINGS

FIG. 19 is a view as in FIG. 18 with the components assembled and with one of the mounting parts removed;

FIG. 20 is a plan view of the components in the FIG. 19 state;

FIG. 21 is a side elevation view of the components in the FIG. 19 state;

FIG. 22 is a rear elevation view of the components in the FIG. 19 state; and FIG. 23 is a schematic representation of connectors cooperating between a body on the handle and a portable tool frame.

DETAILED DESCRIPTION OF THE PREFERRED EMBODIMENT

Figure 1:
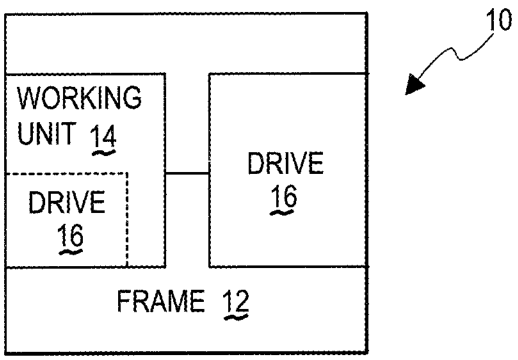
FIG. 1 is a schematic representation of a portable tool, of a type into which the present invention can be incorporated.

The present invention is directed to a portable tool, as shown generically at 10 in FIG. 1. The portable tool 10 consists of a frame 12 on which a working unit 14 is mounted. The working unit 14 is operated by a drive 16 on the frame 12 that is either spaced from the working unit or integrated into the working unit 14, as shown in dotted lines in FIG. 1.

The nature of the working unit 14 is not critical to the present invention, nor is the precise construction of the drive 16. As just examples, the working unit 14 might be a flexible line trimmer, a bladed trimmer, etc.

The drive 16 might be a fuel operated engine, a battery operated motor, etc.

Figure 2:
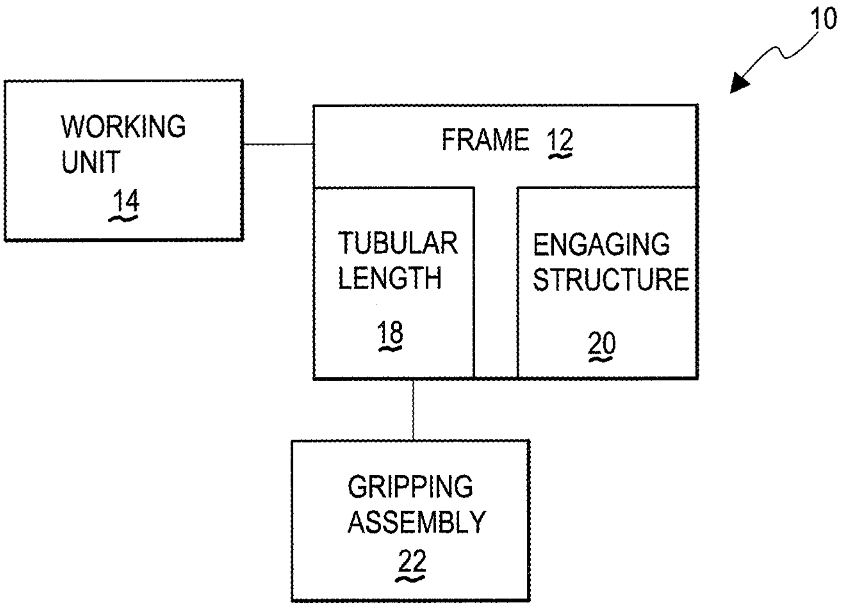
FIG. 2 is a schematic representation of a portable tool as in FIG. 1 and showing additional details thereof.

While the invention is not so limited, a subset of the portable tool 10 has a "stick tool" configuration, as shown generically in FIG. 2, with the frame 12 having a tubular length 18 with a central axis extending in a fore-and-aft direction. The tubular length 18 may define the entire frame length or a portion thereof.

In one exemplary form, as depicted, the working unit 14 is provided at a forward region of the frame 12.

To permit a user to lift and reposition the portable tool 10, the portable tool is configured to be engaged by the user's separate hands at spaced locations. As depicted, an engaging structure 20 is provided at a first back region of the portable tool 10 with a gripping assembly 22 at a second region of the portable tool 10 forward of the first back region. The engaging structure 20 may be a dedicated structure or a configuration of the frame 12 that allows engagement by a user's hand.

The gripping assembly 22 is a dedicated structure strategically placed with respect to the tubular length 18 to facilitate engagement by the user's other hand.

Figure 3:
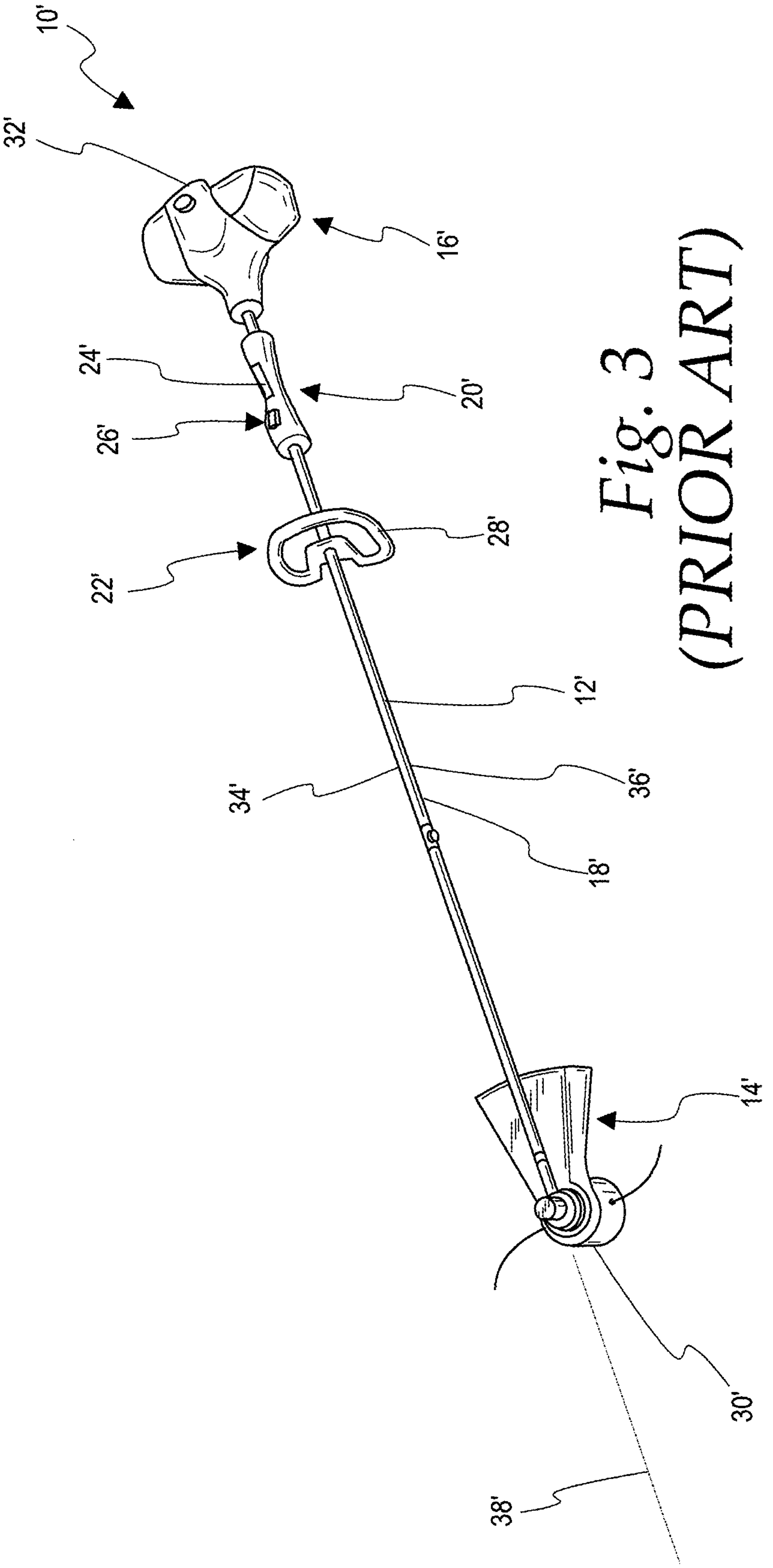
Fig. 3 (PRIOR ART)
FIG. 3 is a perspective view of a commercially available portable tool of the type shown in FIGS. 1 and 2.

In FIG. 3, an exemplary prior art form of portable tool, corresponding to that at 10 in FIGS. 1 and 2, is shown at 10'. The depicted form is one that is commercially sold by the assignee herein.

The portable tool 10', which is commonly identified as a "stick tool", consists of an elongate frame 12' with a working unit 14' at a forward end of the frame 12' and in the form of a flexible line trimmer.

The working unit 14' is operated by a drive 16' at the rear end of the frame 12'. A hand engaging structure 20' is provided forwardly of the drive 16' and has a generally cylindrically shaped body 24' with a portion that can be at least partially surrounded by a hand of a user to allow one or more of the digits on the user's hand to engage controls shown at 26', typically including at least a throttle trigger.

A gripping assembly 22' is situated on the frame 12' forwardly of the engaging structure 20' and has a C-shaped portion 28' that allows a user to grasp the same at various locations.

As depicted, a tubular length 18' on the frame 12' extends substantially fully between the ends of the portable tool 10' and is connected to each of the working unit 14' and drive 16'.

The portable tool 10' is shown in an upright starting orientation, in which it is generally placed, as upon a horizontal, upwardly facing surface, for staging. In this upright starting orientation, the portable tool 10' has a front 30', a rear 32', and laterally spaced sides 34', 36'.

With the portable tool 10' in the upright starting orientation, a user engages the body 24' on the engaging structure 20' by wrapping his/her hand therearound in such a manner as to permit operation of the controls 26'. The other hand can engage the C-shaped portion 28' on the gripping assembly 22', whereupon the movement of the hands can be coordinated to elevate and maneuver the portable tool 10'. The components on the portable tool 10' are designed and located so that when lifted from the upright starting orientation, the weight of the portable tool 10' can be comfortably balanced.

By gripping different regions of the C-shaped portion 28, the angular position of the portable tool 10' around a lengthwise axis 38' of the frame, which in this case is the central axis of the tubular length 18', can be conveniently selected and comfortably maintained during operation, using essentially the same gripping style. At the same time, the gripping arrangement facilitates angling of the portable tool 10' around a laterally extending axis. Accordingly, substantially universal repositioning of the working unit 14' is facilitated by this design.

Figure 4:
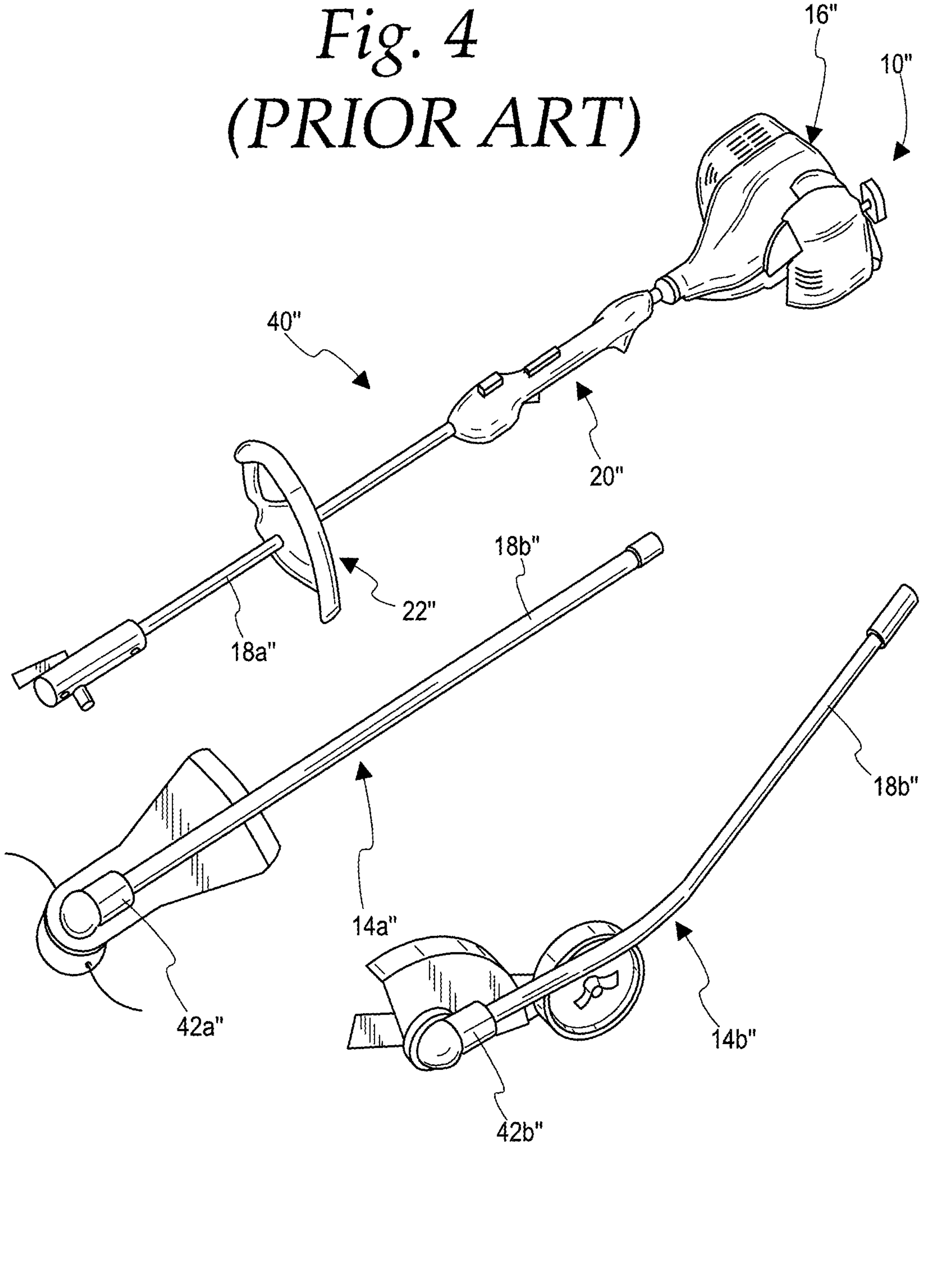
Fig. 4 (PRIOR ART)
FIG. 4 is an exploded, perspective view of another conventional portable tool as shown in FIGS. 1 and 2 and having interchangeable working units.

In FIG. 4, a modified form of portable tool, offered commercially by the assignee herein, is shown at 10". The portable tool 10' has a modular drive unit 40" consisting of a drive 16", engaging structure 20", corresponding to the engaging structure 20' in FIG. 3, a gripping assembly 22", slightly modified from the gripping assembly 22' in FIG. 3, and a tubular length portion **18*a"***.

The modular drive unit 40" is selectively engageable with different representative working unit attachments **14*a*", 14*b*", with the former performing the function of a portable line trimmer and the latter performing the function of a bladed edger. The working unit 14*a*" has a tubular length portion 18*b*" that is joinable to the tubular length part 18*a*" to couple the drive to a driven component 42*a*", whereupon the drive 16" will operate the working unit 14*a"***.

The working unit **14*b*" is connected, in like fashion through a tubular length portion 18*b*", to the tubular length part 18*a*" to couple the drive 16" to a driven component 42*b*" on the working unit 14*b*"** to operate the same.

The assignee herein offers additional working units 14 that are dedicated or interchangeably mountable in the FIG. 4 configuration.

The portable tools 10', 10" are exemplary forms of portable stick tools within the generic showing of FIG. 1. These forms are exemplary in nature only and are provided to show the environment for the hand engaging structures that are the focus of the present invention. The design of the frame 12 in FIG. 1 is not limited, nor is the nature of the working unit 14 or drive 16 therefor. As further noted, the inventive features are not limited to portable tools used in the landscape industry, as depicted in FIGS. 3 and 4.

Figure 5:
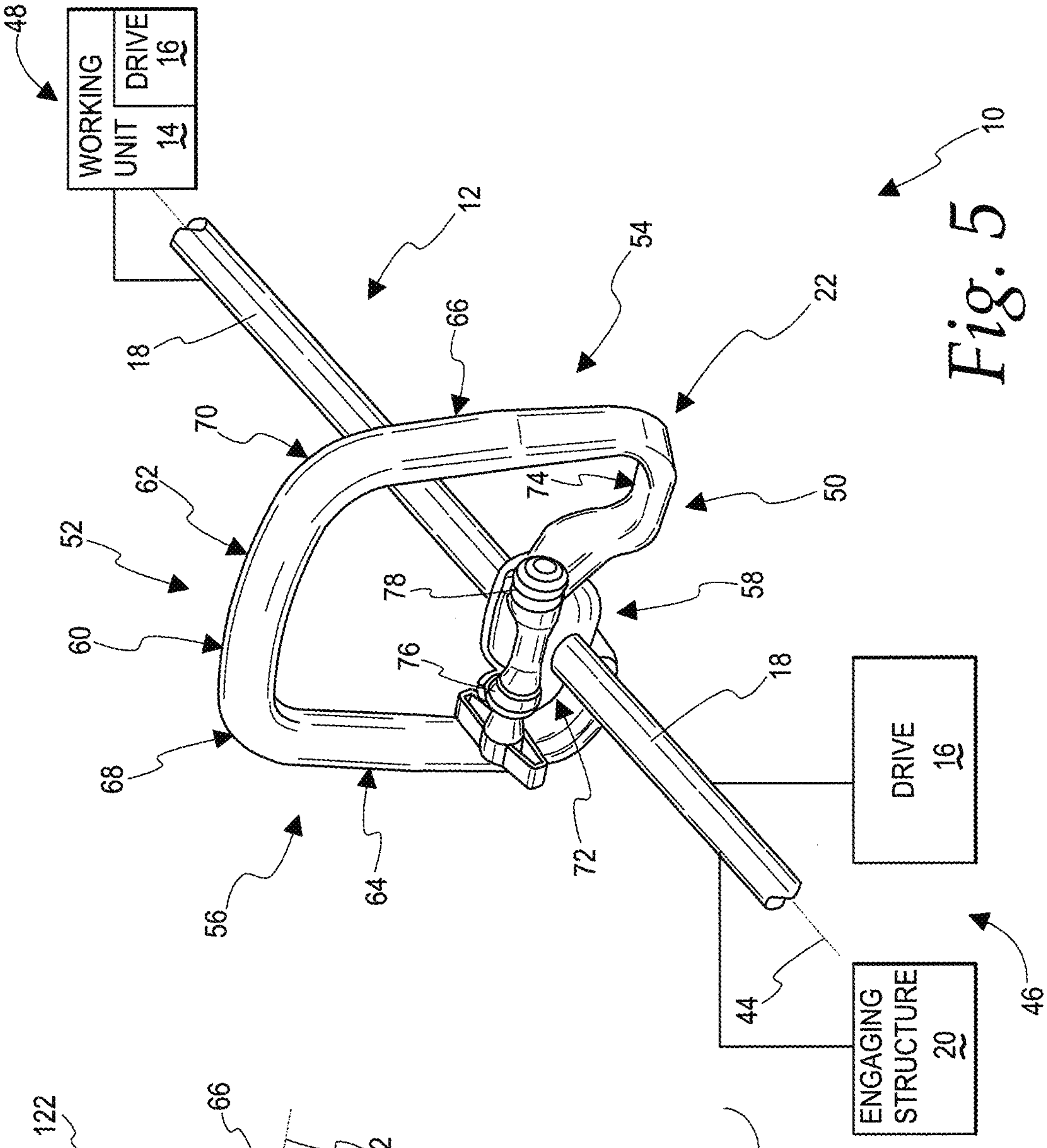
FIG. 5 is a partially schematic representation of a portable tool, as in FIGS. 1 and 2, and showing details of a gripping assembly, according to the invention.

Referring now to FIGS. 5-13, different preferred forms of the invention will be described. In FIG. 5, a gripping assembly 22 is connected to a tubular length 18 of a frame 12. The tubular length 18 has a central lengthwise axis 44 that extends in a first line L1 and defines the lengthwise axis for the overall portable tool 10.

As depicted, the tubular length 18 defines the primary structure of the frame 12 and is connected to the working unit 14. The rearmost hand engaging structure 20 is provided on the tubular length 18 and may take any form, such as, but not limited to, the form shown on the portable tools 10', 10". The drive 16 may be located near the rear end 46 of the portable tool 10 or may be incorporated into the working unit 14 at the front end 48 of the portable tool 10.

Figure 6:
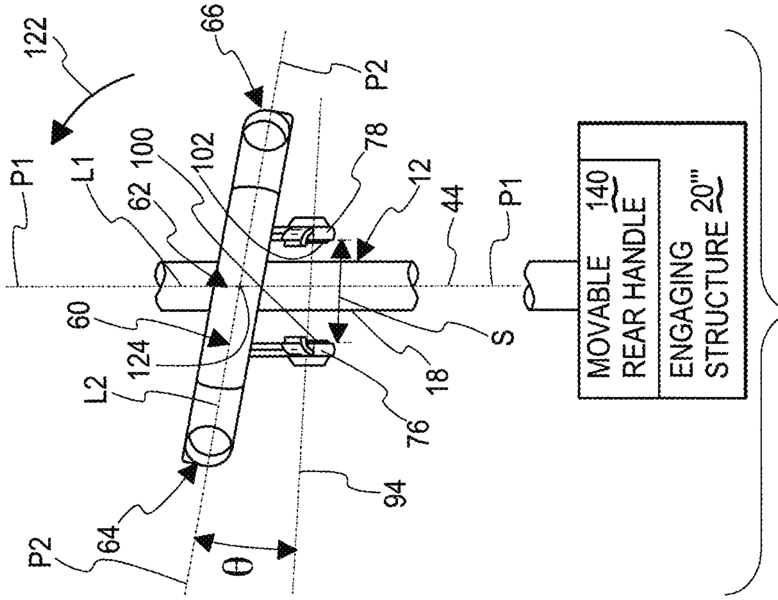
FIG. 6 is a fragmentary, plan view of the portable tool and gripping assembly in FIG. 5 together with a graspable rear, pivoting handle.
Figure 7:
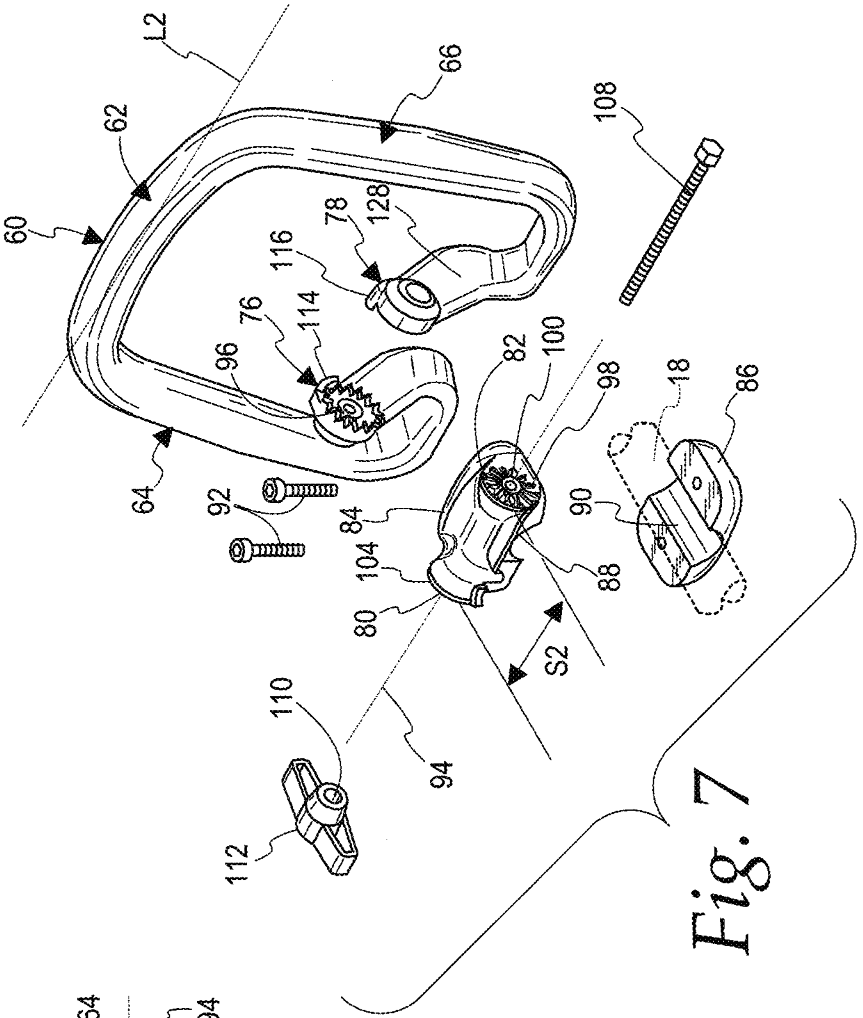
FIG. 7 is an exploded, perspective view of the gripping assembly in FIGS. 5 and 6.

As in the prior art portable tools 10', 10", described above, the portable tool 10 has a starting upright orientation, as shown in FIGS. 5 and 6, wherein the portable tool 10 has a bottom 50, a top 52, and laterally spaced sides 54, 56. The overall portable tool 10, and the frame 12, have front-to-rear lengths.

As with the prior art portable tools 10', 10", described above, the portable tool 10 is configured to be held by a user in the upright starting orientation with the user engaging: a) the engaging structure 20 at a first back region of the portable tool 10 with one of the user's hands; and b) a second region at 58, forward of the first back region, with the user's other hand to thereby allow the user to elevate and reposition the portable tool 10 from the upright starting orientation to thereby controllably reposition the working unit 14. The first back region and second region are spaced along a front-to-rear first line, which in this case is coincident with the central axis 44.

The gripping assembly 22 consists of a C-shaped gripping component 60, with the "C" opening downward with the portable tool 10 in the upright starting orientation. The gripping component 60 consists of an elongate gripping length 62 and first and second side gripping lengths 64, 66 depending from the elongate gripping length 62.

The gripping component 60 has a substantially uniform cross-sectional shape along the grippable portions of the gripping length 62 and side gripping lengths 64, 66. This is not, however, a requirement. As depicted, the cross-sectional shape is substantially oval and of a dimension that a user's fingers can be wrapped therearound to positively maintain the gripping component 60 between the user's fingers and palm. The gripping length 62 transitions to the side gripping lengths 64, 66 at rounded corners 68, 70, respectively. All exposed surfaces are rounded so that no sharp projections are exposed that might cause discomfort to the user's hand.

As seen particularly in FIG. 6, the gripping length 62 and side gripping lengths 64, 66 reside substantially in a single plane. As seen also in FIG. 6, the side gripping lengths 64, 66 are spaced laterally from the tubular length 18 on opposite sides of the frame 12.

As seen in FIG. 5, the side gripping lengths 64, 66 extend to below the tubular length 18.

First and second lengths 72, 74 of the gripping component 60 extend laterally inwardly from the depending gripping lengths 64, 66 and have portions projecting upwardly and terminating at connectors 76, 78, respectively.

The connectors 76, 78 cooperate respectively with connectors 80, 82 fixed to the tubular length 18. The connectors 80, 82 are provided on a mounting part 84 that cooperates with a mounting part 86 to fixedly capture a portion of the tubular length 18 therebetween. More particularly, the mounting part 84 has a curved seat 88 matched generally to the curvature of the tubular length 18, with the mounting part 86 having a like, oppositely opening seat 90. The mounting part 84 is placed on the top of the tubular length 18 with the tubular length 88 nesting in the curved seat 88. The mounting part 86 engages the bottom of the tubular length 18 in like fashion, with the tubular part 18 nesting in the curved seat 90. The seats 88, 90 are dimensioned and configured so that by drawing the mounting parts 84, 86 towards each other, as through the depicted threaded fasteners 92, the tubular length 18 is firmly captively held between the mounting parts 84, 86.

A mounting axis 94 for the gripping component 60 is defined through the connectors 80, 82 on the mounting part 84.

With the mounting parts 84, 86 fixed in place, the connectors 76, 78 on the gripping component 60 can be placed in confronting relationship respectively with the connectors 80, 82.

The connectors 76, 78, 80, 82 have the same general configuration, with the exemplary connector 76 having keying elements 96 to engage keying elements that are the same as the keying elements 98 on the connector 82 that cooperates with the connector 78. The keying elements 96, 98 are annular arrays of teeth that produce gear shapes that can be meshed to fix different angular positions of the gripping component 60 around the mounting axis 94.

In the relaxed state for the gripping component 60, a spacing S (FIG. 6) between axially facing surfaces 100, 102 on the connectors 76, 78 is slightly greater than the spacing S2 (FIG. 7) between axially oppositely facing surfaces 104, 106 on the connectors 80, 82. It is possible that the spacing S can be slightly less than the spacing S2, whereupon the gripping component 60 may have to be slightly deformed to allow the connectors 76, 80 to be spread apart along the axis 94 to allow the surfaces 100, 102 to be placed in facing relationship with the surfaces 104, 106.

A fastener, in this case in the form of an elongate threaded bolt 108, is directed successively through the connectors 78, 82, 80, and 76 to be exposed axially beyond the connector 76. The fastener 108 establishes a pivot connection for the gripping component 60 whereby the gripping component 60 is prevented from being separated from the frame 12 and is guided in pivoting movement relative to the frame 12 with the connectors 76, 80 and 78, 82 disengaged.

A threaded connector 110 for the fastener 108 is integrated into a hand graspable actuator 112.

By tightening the connector 110 to the fastener 108 through manipulation of the frame 12, the keying elements 96 on the connector 76 are placed in keyed relationship with keying elements on the connector 80, corresponding to the keying elements 98, with the keying elements 98 on the connector 82 placed in keyed relationship with keying elements on the connector 78, corresponding to the keying elements 96 on the connector 76. The cooperating keying elements thus mesh and prevent pivoting of the gripping component 60 relative to the fixed connectors 80, 82 on the frame 12.

The tightened fastener 108 is in a first state. By loosening the connector 110 on the fastener 108, the fastener is placed in a second state, wherein the gripping component 60 is allowed to pivot about the axis 94 relative to the frame 12 by reason of the keying elements 96, 98 moving out of the keyed relationship and into a released relationship wherein the connectors 76, 78 can pivot respectively relative to the connectors 80, 82.

Accordingly, by changing the fastener 108 from its first state into its second state, the keying elements can be moved out of keyed relationship into a released relationship whereupon the gripping component 60 is allowed to pivot around the axis 94 relative to the frame 12 into a desired angular relationship with the frame 12. With the desired relationship selected, the fastener 108 can be changed from its second state back into its first state, which meshes the keying elements in a different keyed relationship.

Arcuate shrouds 114, 116 conform at least nominally to the radially facing surfaces on the connectors 80, 82, respectively, to facilitate initial assembly of the gripping component 60 and stably guide relative movement between the gripping component 60 and the connectors 80, 82.

As depicted, the elongate gripping length 62 has a generally straight shape extending in a second line L2 in a lateral direction. As depicted, the elongate gripping length 62 has a slight curvature, with its shape and orientation nonetheless generally identifiable by the line L2. The second line L2 extends laterally across the sides of the frame 12 at a location between the front and rear thereof.

In a preferred form, with the portable article 10 in the upright starting orientation, a first vertical plane P1 through or parallel to the first line L1 is non-orthogonal to a second vertical plane P2 intersecting or parallel to the second line L2.

By pivoting the gripping component 60 around the axis 94, the gripping length 62 is moved vertically and in a fore-and-aft direction relative to the frame 12 while maintaining the angular relationship between the first and second vertical planes P1, P2.

As can be seen in FIG. 6, as the gripping component is pivoted, an angular orientation of the vertical plane P2 relative to the frame 12 occurs.

While the line L2 is shown generally horizontal such that it resides in a third plane P3 that is substantially orthogonal to the first vertical plane P1, a different orientation of the gripping length 62 is contemplated.

In one preferred form, the second vertical plane P2 deviates from an orthogonal relationship with the first vertical plane P1 by an angle θ in the range of 4° to 14°.

In another form, this range is preferably 4° to 10°.

In a still further form, the deviation is an angle θ on the order of 7°.

Figure 14:
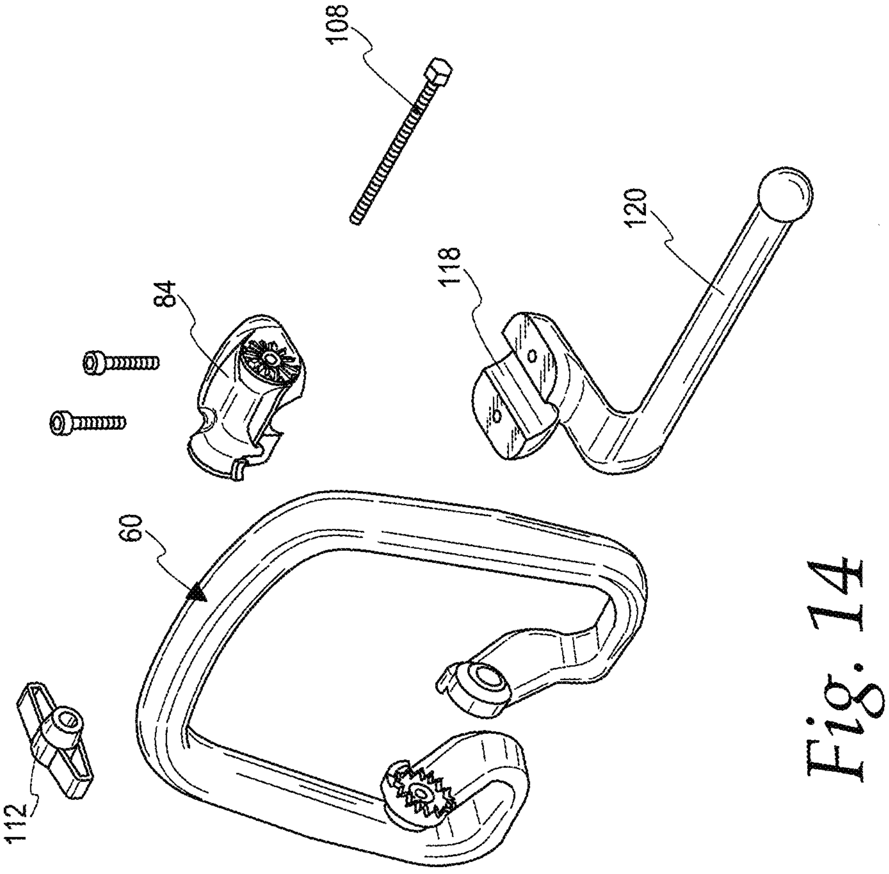
FIG. 14 is an exploded, perspective view as in FIG. 7 and showing a modified form of gripping assembly incorporating a barrier bar.

In FIG. 14, a modified form of the gripping assembly is shown wherein the mounting part 86 is replaced with a mounting part 118 having an integrally formed, laterally projecting barrier bar 120. Barrier bars provide additional safety to the user while facilitating more leveraged control of the portable tool 10. The other components, including the mounting part 84, the fastener 108, actuator 112, gripping component 60, etc., are configured and assembled as previously described.

The depicted embodiment may be particularly desirable for one specific "handed" operator. The elongate gripping length 62 may be reoriented to accommodate an opposite handed person. That is, as seen in FIG. 6, the line L2 may be turned in the direction of the arrow 122 around a vertical axis 124 through two times the angle θ.

For positive gripping and greater comfort, a soft material, such as rubber, may be overmolded on graspable exposed surfaces of the gripping lengths 62, 64, 66 as shown at 125.

Figure 13:
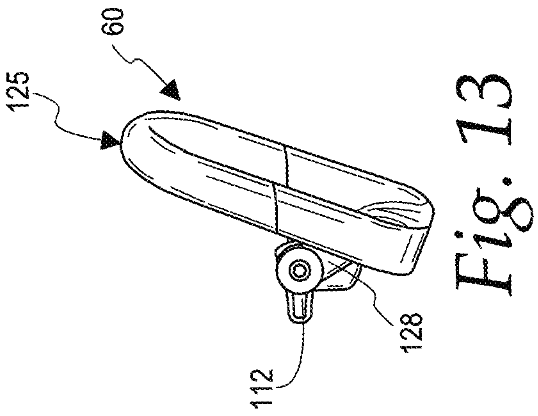
FIGS. 9-13 are different perspective views of the assembled gripping assembly as shown in FIGS. 5-8.
Figure 10:
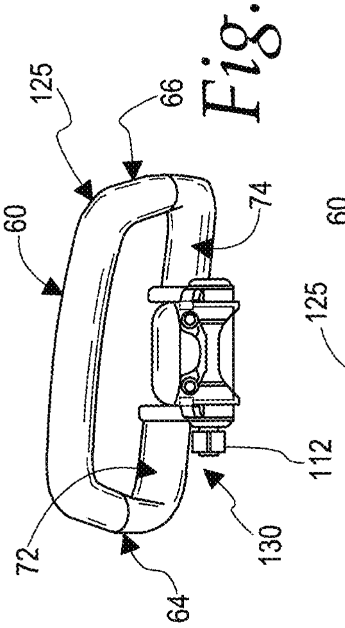
Figure 11:
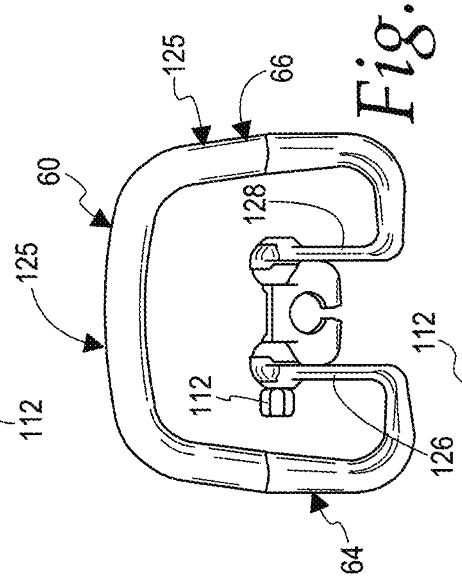
Figure 12:
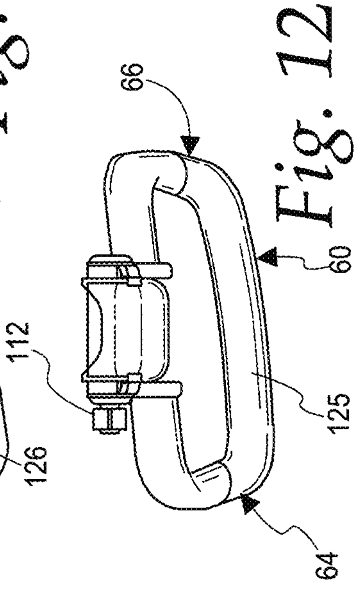
Figure 9:
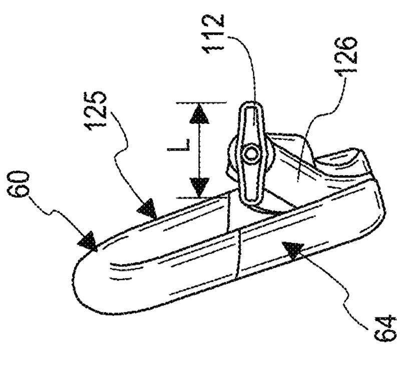

As seen in FIGS. 9, 10, and 13, the lengths 72, 74 have cantilevered projecting portions 126, 128 that extend angularly away from the plane in which the gripping lengths 62, 64, 66 reside, thereby creating an empty volume at 130 adequate to accept a relatively large actuator 112 thereby allowing the user to apply a substantial torque thereto. For example, the actuator 112 may have a length L (FIG. 9) of 2-3 inches without obstructing access to and engagement of the gripping component 60. This facilitates convenient adjustment of the gripping assembly 22 while on a job site, whereas units, such as those in FIGS. 3 and 4, generally have handles/gripping assemblies that are not designed to be pivoted but may be moved lengthwise only by loosening fasteners with separate tools.

Figure 8:
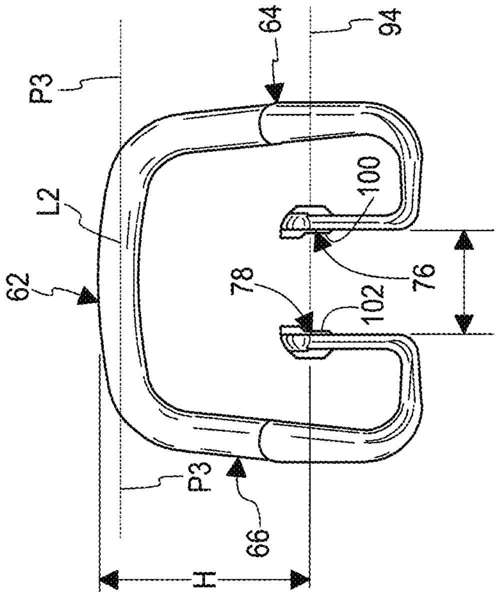
FIG. 8 is a rear elevation view of a part of the gripping assembly as shown in FIGS. 5-7.

For added comfort, particularly for persons with back issues, the gripping assembly dimension H in FIG. 8 is at least 4.5 inches and more preferably at least 5 inches. The top of the gripping length is even further above the tubular length 18.

To add further versatility, as shown in FIG. 6, a movable rear handle may define part or all of the rear engaging structure 20'''. The rear handle 140 may be graspable and pivotable around one or more axes, such as laterally and/or vertically extending axes.

In FIGS. 15-22, an exemplary form of the handle 140, shown generically in FIG. 6, is depicted.

Figure 15:
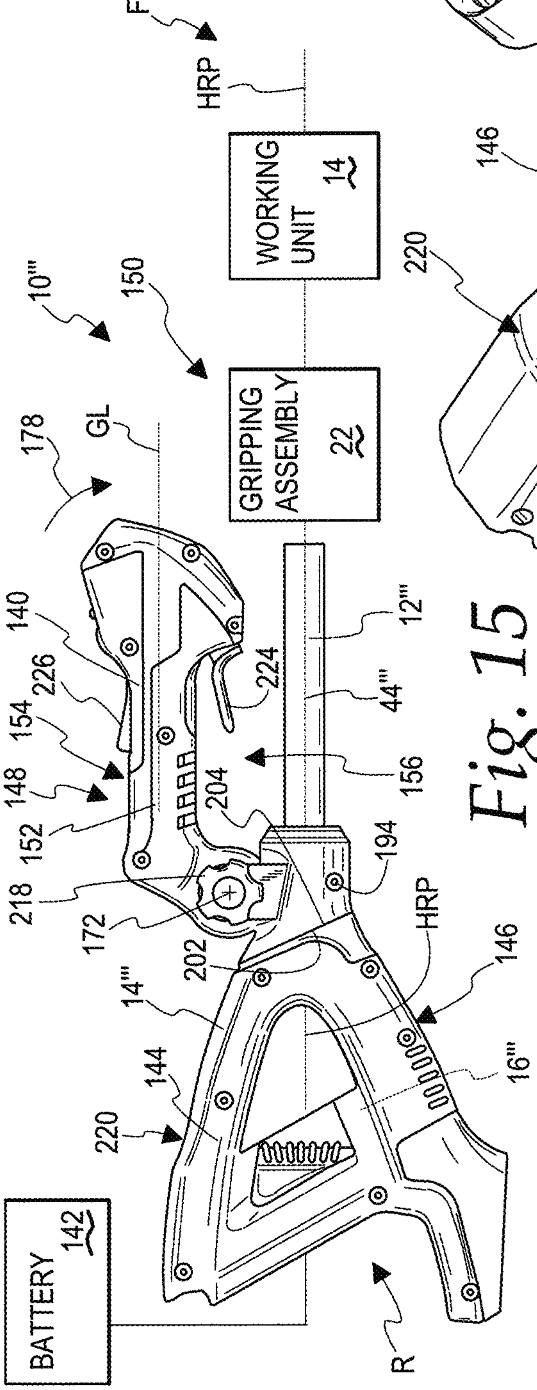
FIG. 15 is a partially schematic, side elevation view of a modified form of portable tool, according to the present invention, including an exemplary form of graspable rear handle, as shown schematically in FIG. 6.
Figure 16:
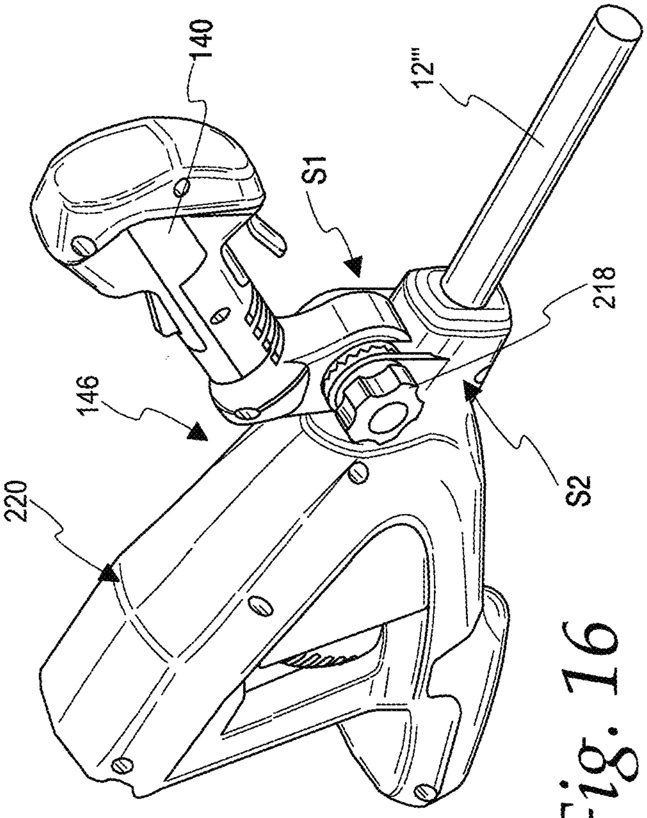
FIG. 16 is a fragmentary, perspective view of the portable tool in FIG. 15 and showing the handle in a different position than in FIG. 15.

In FIG. 15, the handle 140 is shown integrated into a portable tool 10''' with an elongate frame 12''' on which a working unit 14 is mounted. In this embodiment, the portable tool 10''' incorporates a gripping assembly 22, either as generically described above, or as shown in exemplary forms, described hereinabove.

Without limitation, the working unit 14''' has a drive 16''' that is operated by a battery 142. The drive 16''' and battery 142 may have any conventional form well-known to those skilled in the art. In this embodiment, the drive 16''' is incorporated into a housing 144. The battery 142 and drive 16''' together define a power unit 146 which is operable to operate the working unit 14.

As noted previously, the precise relationship between the working unit and drive is not critical. For example, the drive might be provided as part of the working unit. Further, the nature of the drive is not critical since the invention can be practiced with portable tools having power units using combustion engines, motors that are driven by household current, etc.

As in other embodiments, the portable tool 10''' has a front F, a rear R, and spaced sides S1, S2. The frame 12''' has a tubular configuration over at least a portion of the fore-and-aft length thereof.

In FIG. 15, the portable tool 10''' is shown in a reference starting orientation wherein a front-to-rear lengthwise axis 44''' extends substantially horizontally.

The portable tool 10''', as in prior embodiments, is intended to be held in the starting orientation with one of the user's hands engaging the portable tool at a first region at 148, whereat the handle 140 is located, and the other of the user's hands engaging the portable tool at a second region at 150, spaced forwardly of the first region 148, at which the gripping assembly 22 is located.

The handle 140 has a body 152 with a gripping length 154 that extends along a gripping line GL. The gripping length 154 is configured so that a user's fingers on one hand can be wrapped against the gripping length 154 to thereby grasp the gripping length 154.

The handle 140 may have a fixed relationship with the frame but as shown, and more preferably, is movable relative to the frame 12''', as described hereinbelow. If in a fixed relationship, the handle 140 may be oriented in any of those positions within the range of movement described hereinbelow.

As shown in FIG. 15, the handle 140 is in a first position. The gripping line GL is approximately parallel to a horizontal reference plane HRP containing the lengthwise axis 44'''.

With the depicted configuration for the handle 140, a space at 156 is formed between the gripping length 154 and the frame 12''' to accommodate fingers on the user's hand that is grasping the gripping length 154.

With the handle 140 in this position, a user can comfortably grasp the gripping length 154 and exert a vertical force to comfortably bear a large percentage of the overall weight of the portable tool, particularly in this construction with the handle 140 located adjacent to and forwardly of the power unit 146.

This handle position further facilitates control and advancement of certain types of working unit configurations contemplated.

The handle body 152 has a mounting end 158 that is connected to the frame 12''', and a free end 160 spaced from the mounting end 158 along the gripping line GL.

A substantial length of the handle body 152 at a region at 162, adjacent to the free end 160, is enlarged at diametrically opposite sides 164, 166 of the gripping line whereby at a transition to the enlarged shape there are diametrically oppositely located shoulder regions 168, 170 that block sliding movement of the user's hand, grasping the gripping length GL, up to and past the free end 160 of the body 152. A shoulder 171, near the mounting end 158, blocks sliding movement of the user's hand away from the free end 160.

Aside from preventing inadvertent translation of the user's hand along the gripping line GL off of the handle 140, the shoulder regions 168, 170 also act as bearing surfaces which facilitate particularly forward advancement of the power tool by the hand grasping the gripping length GL. Thus, the ability to exert a forward force through the gripping hand is not limited to the tenacity of the gripping force applied to the gripping length 154.

While any of the positions of the handle 140 within the described movable range may be permanently fixed, more preferably, the handle 140 is movable relative to the frame 12'''. As shown in FIG. 6, this movement may be in multiple dimensions. In the depicted embodiment, the movement of the handle 140 relative to the frame 12''' is primarily angular movement around an axis 172 extending in a side-to-side direction. The axis 172 may be orthogonal to the axis 44''', as viewed from above. However, this is not a requirement.

As depicted, the handle body 152 has a primary length portion 174, extending along the gripping length GL, and a mounting portion 176 that projects away from the primary length portion 174 at an angle to the gripping line GL. The mounting portion 176 is connected for pivoting movement relative to the frame 12''' around the axis 172 that extends through the mounting portion 176.

The offset arrangement of the mounting portion 176 is responsible for maintaining the space 156 with an adequate volume to accommodate the user's fingers with the handle 140 in the FIG. 15 position. The vertical dimension of the space 156 may be, for example and without limitation, 1-3 inches.

Figure 17:
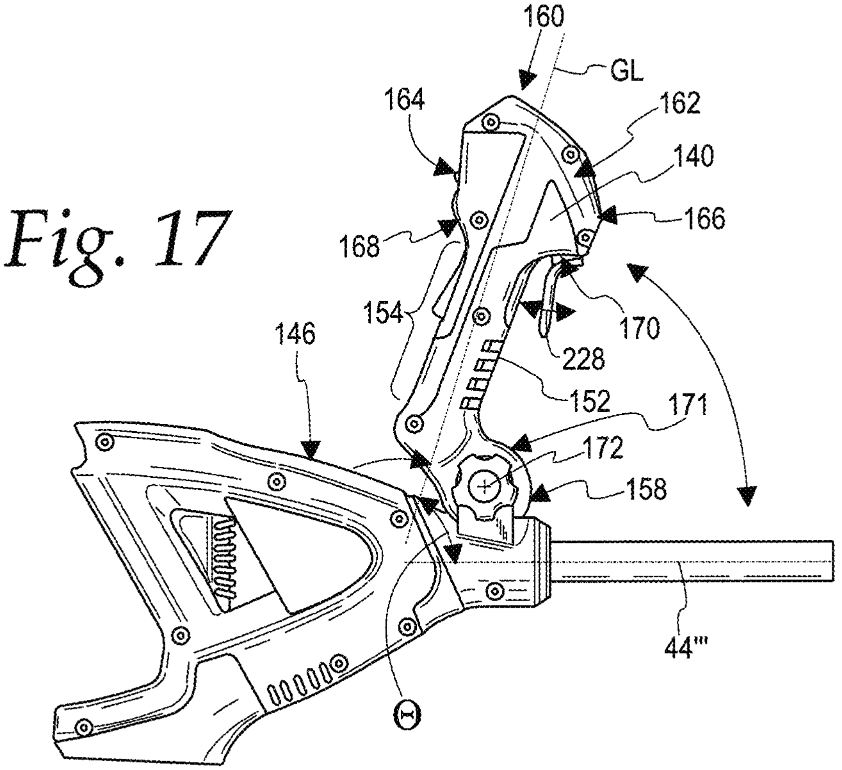
FIG. 17 is a side elevation view of the components in the state in FIG. 16.

The handle is pivotable from the FIG. 15 position to at least the position in FIG. 17, wherein an angle θ between the gripping line GL and the axis 44''' is approximately 75°. The depicted clearance region between the body 152 and power unit 146 is adequate that the handle 140 may be pivoted so that the angle θ exceeds 90°.

While the handle 140 as depicted in FIG. 15 is situated so that the gripping line GL is substantially parallel to the axis 44''', the handle may be pivoted further in the direction of the arrow 178.

It is preferred, though not required, that if the relationship between the gripping line GL and axis 44''' is not substantially parallel, that the resulting angle θ be selectable to be no more than 15°, or more preferably no more than 10°, to achieve certain ergonomic and operational advantages contemplated.

As shown generically in FIG. 23, there is at least one connector 180 on the frame 12''' that cooperates with at least one connector 182 on the handle body 152 to selectively releasably maintain the handle 140 in different positions relative to the frame 12'''.

In the depicted embodiment, there are first and second connectors 180*a*, 180*b* on the frame that cooperate respectively with first and second connectors 182*a*, 182*b* on the handle body 152.

Figure 18:
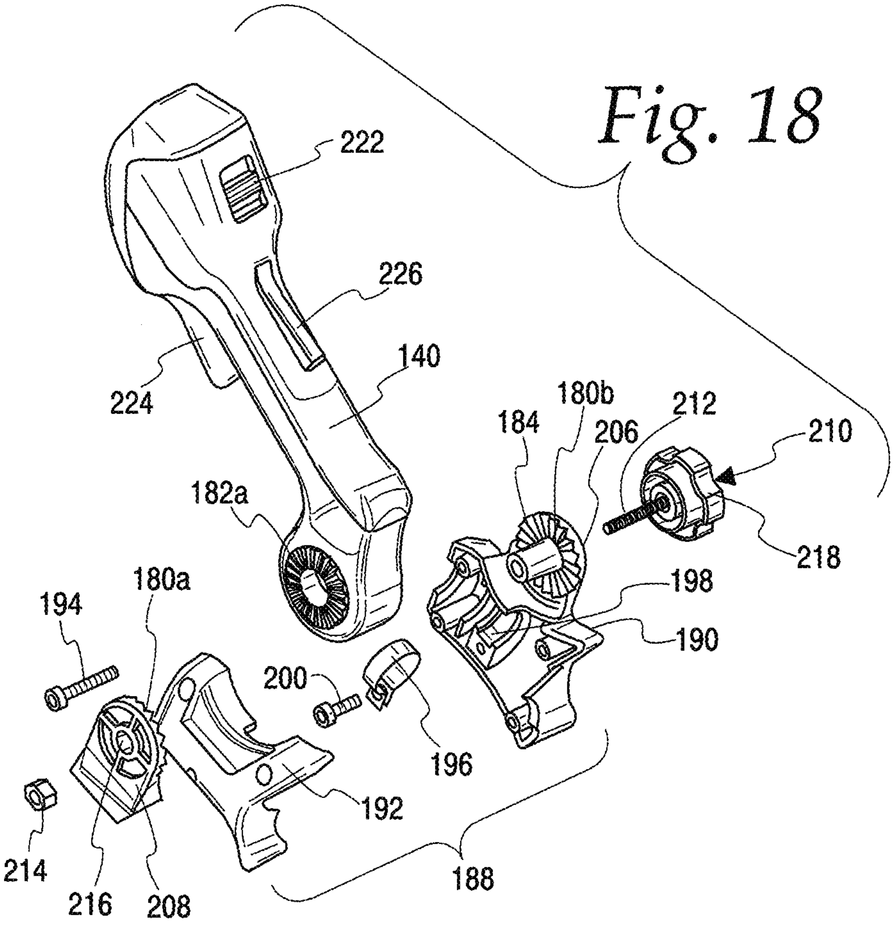
FIG. 18 is an exploded perspective view of the handle in FIGS. 15-17 and including a mounting assembly therefor.

The connectors 180*a*, 182*a* and 180*b*, 182*b* cooperate in like fashion. As seen in FIG. 18, the connector 180*b* has an annular arrangement of radially extending teeth 184 which cooperate with a matched arrangement of teeth 186 on the connector 182*b*. The teeth 184, 186 can be meshed in similar fashion to maintain the handle 140 in different angular positions relative to the frame 12'''.

The connectors 180*a*, 180*b* are joined to the frame 12''' through a mounting assembly 188. The mounting assembly 188 consists of joinable parts 190, 192 between which the frame 12''' can be captively placed. Threaded fasteners 194 (one shown in FIG. 18) are directed through the part 192 and into the part 190 to maintain the captive engagement with the frame 12'''. A restrictable anchoring ring 196, surrounding the frame 12''' and placed in a receptacle 198 defined cooperatively by the parts 190, 192, can be reduced in diameter by tightening a fastener 200 extending through the part 192 and into the part 190. By restricting the diameter of the ring 196, the entire mounting assembly 188 is frictionally fixed against turning relative to the frame 12''' and sliding relative to the frame 12''' along the axis 44'''.

As depicted, the mounting assembly 188 has a rear contour 202 that is complementary to a contour 204 at the forward region of the power unit 146.

Bendable supports 206, 208 are mounted, one each, to the parts 190, 192, respectively, and respectively support the connectors 180*b*, 180*a*. The bendable supports 206, 208 are similarly constructed to support a respective connector 180*b*, 180*a*.

For the exemplary bendable support 208, in a relaxed state therefor, the teeth on the associated connector 180*a* are situated so that they are not forced into meshed relationship with teeth on the connector 182*a*.

An actuator 210 has a threaded shank 212 that is directed through the connectors 180*b*, 180*a* and threadably engaged with a nut 214 keyed within a socket 216 on the support 208. A graspable knob 218 is connected to the shank 212 and moves as one piece therewith.

With the actuator 210 initially loosened, the teeth on the connectors 180*a*, 182*a*, 180*b*, 182*b* are allowed to disengage. This represents a released state for the actuator 210, wherein the bendable supports 206, 208 are each in a relaxed state. This represents an adjusting state for the handle 140, which is allowed to be manually pivoted around the axis 172 into a desired angular position.

Once a desired position is selected, the actuator 210 is turned in a tightening direction and thereby is changed from a released state into a secured state, which corresponds to an operating state for the handle. With the actuator in the secured state, the teeth on the connectors 180*a*, 182*a* and 180*b*, 182*b* are forced into, and maintained in, meshed relationship to thereby maintain the handle 140 in the selected position. By tightening the actuator 210, the supports 206, 208 are biased out of their relaxed state. Once the actuator 210 is changed from the secured state into the released state, as an incident of which the portable tool is changed from the operating state into the adjusting state, restoring forces in the bendable supports 206, 208 urge them each back towards its relaxed state.

Given the proximity of the handle 140 to the power unit 146, an upper surface 220 on the power unit 146 is strategically located to provide a support for a forearm region of the user's arm, rearwardly of the region where the handle 140 is grasped by the user's hand.

The depicted configuration of the handle 140 provides a number of locations at which controls/actuators can be placed and conveniently and comfortably accessed by the fingers on the user's hand that is gripping the handle 140.

As depicted, an on/off switch 222 for the drive is located so that a thumb of the user's gripping hand can conveniently engage and effect shifting thereof.

On diametrically opposite sides of the gripping line, a throttle lever 224 and safety switch 226 are provided. The safety switch 226 has a conventional construction wherein it is required to be depressed to allow the throttle lever 224 to be moved back-and-forth within a range as indicated by the double-headed arrow 228 in FIG. 17, to change the operating speed of the working unit 14. With the user's hand grasping the handle 140, the throttle lever 224 and safety switch 226 can be comfortably simultaneously squeezed.

The foregoing disclosure of specific embodiments is intended to be illustrative of the broad concepts comprehended by the invention.

The invention claimed is:

1. A portable tool having a front, a rear, and spaced sides and comprising:

an elongate frame with a length and a front-to-rear lengthwise axis;

the portable tool comprising a working unit on the frame and a drive for the working unit, the portable tool configured to be held in a starting orientation, wherein the lengthwise axis of the frame extends substantially horizontally, with a user's hands engaging the portable tool at a first region and a second region spaced forwardly of the first region; and the portable tool having: a) a gripping assembly at the second region; and b) an engaging structure at the first region and comprising a handle, the handle comprising a body with a gripping length that extends along a gripping line and is configured so that a user's fingers on one hand of the user can be wrapped against the gripping length to grasp the gripping length in the one hand, the handle connected to the frame and configured so that with the portable tool in the starting orientation and the handle in a first position: i) the handle gripping line makes an angle of no more than 15° with a horizontal reference plane containing the lengthwise axis of the elongate frame; and ii) a space is formed between the gripping length and the elongate frame to accommodate fingers on the user's one hand with the user's one hand grasping the gripping length, wherein the handle body has a mounting portion that projects at an angle to the gripping line.

2. The portable tool according to claim 1 wherein with the portable tool in the starting orientation and the handle in the first position the handle gripping line makes an angle of no more than 10° with the horizontal reference plane.

3. The portable tool according to claim 1 wherein with the portable tool in the starting orientation and the handle in the first position, the handle gripping line is approximately parallel to the horizontal reference plane.

4. The portable tool according to claim 1 wherein the handle is movable relative to the frame to change the angle the gripping line makes with the horizontal reference plane with the portable tool in the starting orientation.

5. The portable tool according to claim 1 wherein the mounting portion is connected for pivoting movement relative to the elongate frame around an axis extending in a side-to-side direction through the mounting portion and spaced from the gripping line.

6. The portable tool according to claim 1 wherein the handle body has a mounting end and a free end spaced from each other along the gripping line and a region of the body adjacent the free end is enlarged to block sliding movement of a user's one hand, grasping the gripping length, up to and past the free end of the body.

7. The portable tool according to claim 1 wherein the handle body has at least one of: a) an on/off switch for the drive; and b) a movable throttle lever for controlling an operating speed for the drive.

8. The portable tool according to claim 1 wherein the handle is movable relative to the frame and further comprising at least one connector on the frame that cooperates with at least one connector on the handle body to selectively releasably maintain the handle in different positions relative to the frame.

9. The portable tool according to claim 8 wherein the at least one connector on the frame comprises first and second connectors on the frame and the at least one connector on the handle body comprises first and second connectors that respectively cooperate with the first and second connectors on the frame to releasably maintain the handle in different positions relative to the frame.

10. The portable tool according to claim 8 wherein the one connector on the frame has a plurality of teeth configured to mesh with a plurality of teeth on the one connector on the handle body with the handle in different positions relative to the frame.

11. The portable tool according to claim 10 wherein the portable tool has an adjusting state for the handle and an operating state for the handle, the portable tool further having an actuator that is changeable between a released state and a secured state, with the actuator in the released state, the plurality of teeth on the one connector on the frame are not meshed with the plurality of teeth on the one connector on the handle body, thereby allowing the handle to be repositioned relative to the elongate frame and with the actuator in the secured state, the plurality of teeth on the one connector on the frame are meshed with the plurality of teeth on the one connector on the handle body to thereby maintain the handle in any one of a plurality of selectable positions relative to the frame.

12. The portable tool according to claim 1 wherein the drive for the tool is a battery-operated drive.

13. The portable tool according to claim 12 wherein the portable tool further includes a battery and the battery and drive together define a power unit, the handle is located adjacent to and forwardly of the power unit, and the power unit defines an upwardly facing surface to support a forearm on an arm of a user with the one hand grasping the gripping length.

14. The portable tool according to claim 11 wherein the actuator is a threaded actuator that is turned around an actuator axis to change the actuator between the secured and released states and the actuator has a knob that is configured to be grasped by a user's hand to facilitate turning of the actuator around the actuator axis.

15. A portable tool having a front, a rear, and spaced sides and comprising:

an elongate frame with a length and a front-to-rear lengthwise axis;

the portable tool comprising a working unit on the frame and a drive for the working unit, the portable tool configured to be held in a starting orientation, wherein the lengthwise axis of the frame extends substantially horizontally, with a user's hands engaging the portable tool at a first region and a second region spaced forwardly of the first region; and the portable tool having: a) a gripping assembly at the second region; and b) an engaging structure at the first region and comprising a handle, the handle comprising a body with a gripping length that extends along a gripping line and is configured so that a user's fingers on one hand of the user can be wrapped against the gripping length to grasp the gripping length in the one hand, the handle connected to the frame and configured so that with the portable tool in the starting orientation and the handle in a first position: i) the handle gripping line makes an angle of no more than 15° with a horizontal reference plane containing the lengthwise axis of the elongate frame; and ii) a space is formed between the gripping length and the elongate frame to accommodate fingers on the user's one hand with the user's one hand grasping the gripping length, wherein the handle is movable relative to the frame and further comprising at least one connector on the frame that cooperates with at least one connector on the handle body to selectively releasably maintain the handle in different positions relative to the frame, wherein the one connector on the frame has a plurality of teeth configured to mesh with a plurality of teeth on the one connector on the handle body with the handle in different positions relative to the frame, wherein the portable tool has an adjusting state for the handle and an operating state for the handle, the portable tool further having an actuator that is changeable between a released state and a secured state, with the actuator in the released state, the plurality of teeth on the one connector on the frame are not meshed with the plurality of teeth on the one connector on the handle body, thereby allowing the handle to be repositioned relative to the elongate frame and with the actuator in the secured state, the plurality of teeth on the one connector on the frame are meshed with the plurality of teeth on the one connector on the handle body to thereby maintain the handle in any one of a plurality of selectable positions relative to the frame, wherein the one connector on the frame is mounted on a bendable support that is on a mounting assembly secured to the frame and with the actuator in the released state the bendable support is in a relaxed state, wherein the plurality of teeth on the one connector on the frame are not meshed with the plurality of teeth on the one connector on the handle body, and with the actuator in the secured state a part of the bendable support is biasably moved to cause the plurality of teeth on the one connector on the frame to be meshed with the plurality of teeth on the one connector on the handle body.

16. The portable tool according to claim 1 wherein the handle is pivotable relative to the frame through a range of at least 75°.

17. The portable tool according to claim 1 wherein the gripping assembly has a gripping length extending in a side-to-side direction.

18. The portable tool according to claim 17 wherein the gripping assembly is configured so that a position of the gripping length on the gripping assembly relative to the frame can be changed.

19. The portable tool according to claim 18 wherein the position of the gripping length on the gripping assembly relative to the elongate frame is changed by pivoting the gripping length on the gripping assembly relative to the frame around an axis.

20. The portable tool according to claim 1 wherein the mounting portion defines a shoulder that blocks sliding movement of a user's hand, grasping the gripping length, along the gripping line.

21. The portable tool according to claim 20 wherein the handle body has a free end and the shoulder blocks sliding movement of a user's hand, grasping the gripping length, along the gripping line away from the free end of the handle body.

22. The portable tool according to claim 1 wherein the mounting portion projects angularly away from the gripping length of the body.

23. The portable tool according to claim 22 wherein the mounting portion is connected for pivoting movement relative to the elongate body about an axis and the handle body and mounting portion move as one piece around the axis.

24. The portable tool according to claim 22 wherein with the portable tool in the starting orientation the mounting portion projects downwardly away from the gripping length of the body.

* * * * *